Oct. 30, 1934.  A. W. WHARTON  1,978,872
WAFFLE IRON OR THE LIKE
Original Filed Sept. 3, 1930   2 Sheets-Sheet 1

WITNESS:

INVENTOR
Astley W. Wharton
BY
ATTORNEYS.

Oct. 30, 1934.  A. W. WHARTON  1,978,872
WAFFLE IRON OR THE LIKE
Original Filed Sept. 3, 1930  2 Sheets-Sheet 2

WITNESS:

INVENTOR
Astley W Wharton
BY
Busser & Harding
ATTORNEYS.

Patented Oct. 30, 1934

1,978,872

UNITED STATES PATENT OFFICE 1,978,872

WAFFLE IRON OR THE LIKE

Astley W. Wharton, Philadelphia, Pa.

Application September 3, 1930, Serial No. 479,460
Renewed June 27, 1933

6 Claims. (Cl. 53—10)

This invention relates to a waffle iron or similar baking or toasting apparatus and particularly to an electrically heated form adapted to interrupt the baking or toasting operation after a predetermined time.

In the baking of waffles, pancakes or the like, mere interruption of the heating current after a predetermined time will not immediately stop the baking operation due to the heat in the surfaces contacting with the cake being baked.

It is accordingly one object of the present invention to provide means whereby the cake and heating surface or surfaces are relatively moved away from each other, permitting the formation of an intermediate air space and thereby preventing over-heating or burning.

Specifically, it is the object of the invention to provide an arrangement whereby, after a predetermined time, the top portion of the waffle iron or the like is raised from the cake which is being baked. A further object of the invention is the provision of means for raising such cake from a lower heating surface.

Further specific objects of the invention particularly relating to details will be apparent from the following description read in conjunction with the accompanying drawings, in which.

Figure 1:
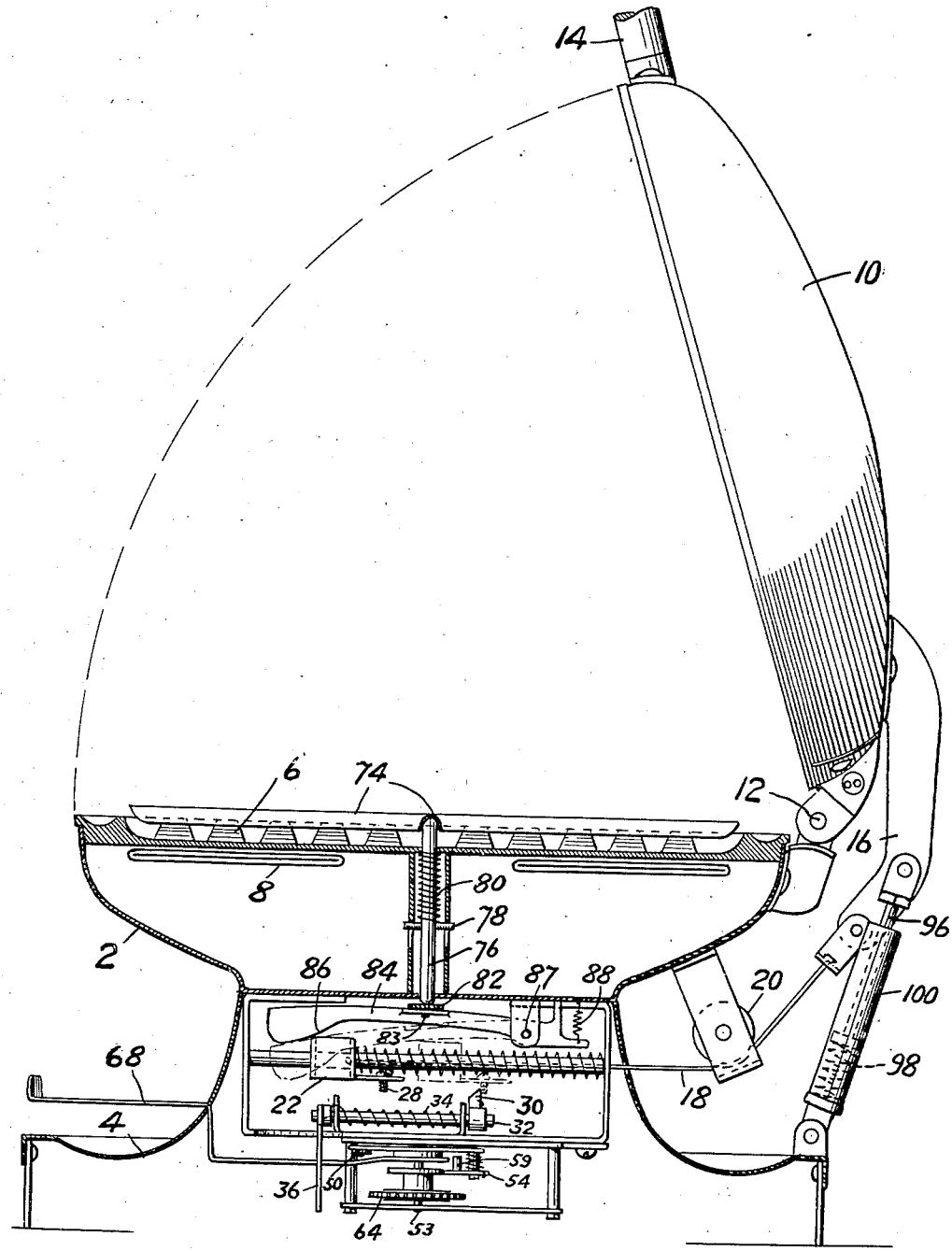
Fig. 1 is a vertical section through one embodiment of the invention.

In the following specification and claims it will be understood that the term "cake" is used in a generic sense to include waffles, cakes or the like, and also toast.

In the embodiment shown, the instrument, which is in the form of an electrically heated waffle iron, comprises a lower casing 2 surmounting a hollow base 4. Carried by the casing is the usual lower grid 6 of aluminum, or other suitable material, adapted to be heated by a heating element 8 which may be of any of the usual forms used for that purpose. A cover 10 is pivoted to the casing at 12 carries the usual upper grid which is heated by its individual element, not shown, the two elements being connected either in series or parallel for control by the same circuit.

A handle 14, secured to the free end of the cover 10 and composed of heat insulating material, is adapted to be manually manipulated to close the cover to bring the two grids into adjacent relationship. An arm 16 carried by the cover and extending outwardly over the pivot 12 is connected by a cable 18 passing over a pulley 20 to a slide 22 guided on parallel rods 24 and urged in a direction to effect opening of the cover by springs 26 mounted on the rods 24. A projection 28 on the slide 22 which, in the present instance, takes the form of a small screw, is adapted to engage behind a latch 30 consisting of an arm carried by a short shaft 32 which is normally urged by a spring 34 in a direction to move the latch 30 upward into position to engage the projection 28. The end of the shaft 32 opposite the latch arm 30 carries a lever 36 of angular shape, as illustrated.

Figure 4:
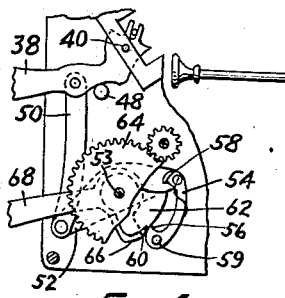
Figs. 4 and 5 are detail views of the timing mechanism.

A suitable timing mechanism mounted in the base includes a lever 38 pivoted at 40 and projecting outwardly through a slot 42 in the base provided with a small cut-out portion 44 for a purpose to be later described. A spring 46 normally urges this lever in a counter-clockwise direction, as viewed in Fig. 2, against a stop 48. A link 50 connects the lever 38 to a member 52 journalled on a pin 53 and carrying pivotally at its outer end an element 54 which comprises a nose 56 and an abutment 58 and carries a pin 59 projecting upwardly therefrom adjacent the nose 56. A spring normally urges the element 54 in a clockwise direction about its pivot, as illustrated in Fig. 4. The nose 56 of the lever 54 is adapted to engage a notch 60 in a member 62 also pivoted on the pin 53 and clutched to the first gear of a clockwork mechanism, which may be of any usual type and which is designated generally at 64. This clockwork mechanism comprises the usual train of gears serving to actuate an escapement so that the first gear thereof moves slowly.

A cam 66 is formed on the end of a lever 68 which is pivoted on the pin 53 and projects outwardly through a slot in the base. The clutch between the member 62 and the first gear of the clockwork mechanism is such that movement of member 62 relative to the first gear may take place freely in a clockwise direction, as viewed in Fig. 4, but not in a counterclockwise direction, the gear moving with the member in this direction.

Figure 2:
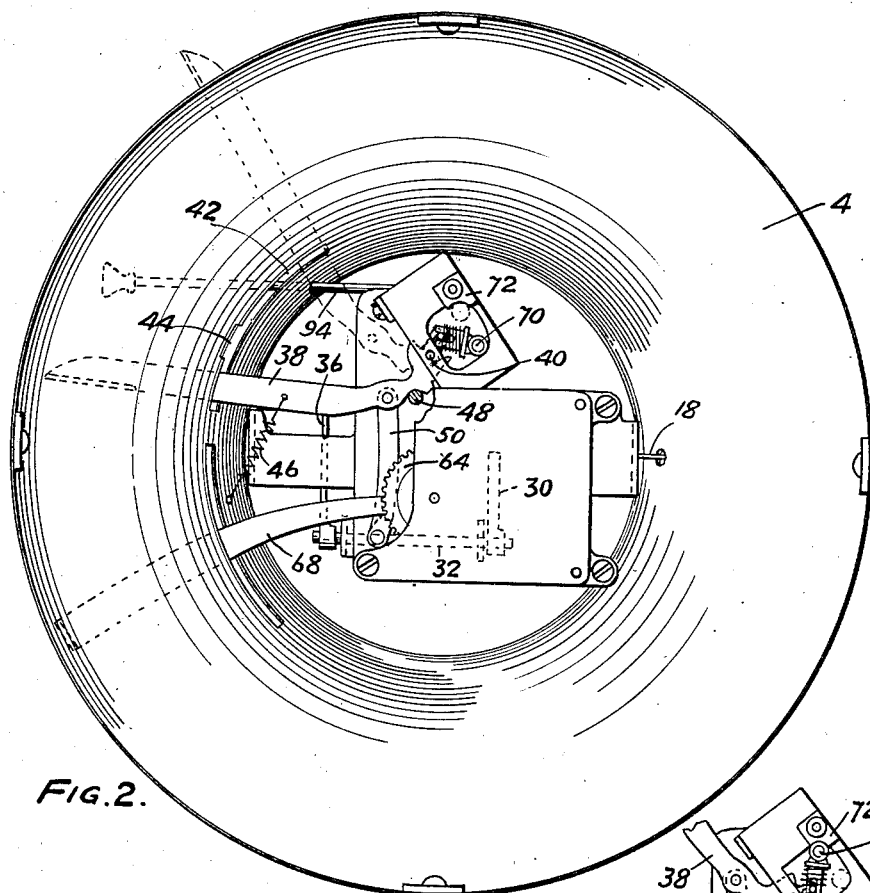
Fig. 2 is a bottom plan view of the same.
Figure 5:
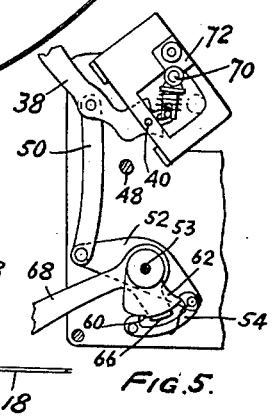

A snap switch 70 is arranged to be actuated by the end of the lever 38 so as to be moved from the full line position illustrated in Fig. 2 to the dotted line position in which it engages contacts 72 to close the circuit through the heating elements of the device. The switch 70 is illustrated in open circuit position in full lines in Fig. 2 and in closed circuit position in full lines in Fig. 5.

In order to lift the cake from the grid 6 at the proper time, there is provided a member 74 in the form of a cross which in the present instance is adapted to engage between the quadrants of a waffle of conventional type. The member 74 is carried by the upper end of a plunger 76 suitably guided for vertical movement in the casing and held from rotation by a pin 78 carried thereby and projecting through slots in a fixed guiding sleeve. A spring 80 normally urges the plunger and the member 74 to lowermost position.

Adapted to be moved into the path of the plunger 76 is a lever 82, pivoted at 83 to a cam lever 84 and provided with a cam surface 86 arranged for engagement by the slide 22. The cam lever 84 is pivoted at 87 and is urged by a spring 88 in a counterclockwise direction, as viewed in Fig. 1. A stop 90 limits the movement of the lever 82 under the action of a tension spring 92, the limited position being such that a lever 82 is in the path of the plunger 76. A rod 94 pivoted to the end of the plunger extends outwardly through the base for manual manipulation. A stop 95 limits the manual movement of the lever.

In the operation of the device, let it be assumed that the parts are in the positions illustrated in Fig. 1, at which time the cover 10 and member 74 will be in raised position, the position of the latter being due to engagement of the plunger 76 by a lever 82 which is moved upwardly by the position of slide 22 in engagement with the cam surface 86. At the same time the lever 38 will occupy the full line position illustrated in Fig. 2 and the switch will be open.

Figure 3:
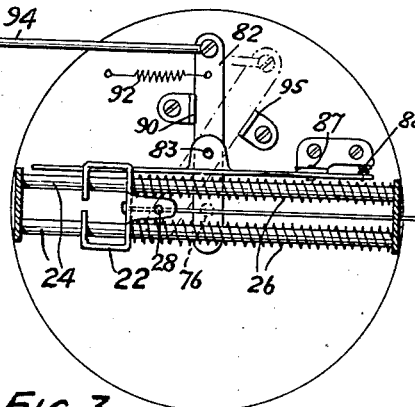
Fig. 3 is a bottom plan view of certain details of the apparatus, parts being broken away.

By manual pressure exerted upon the rod 94, the lever 82 may be moved to the dotted line position illustrated in Fig. 3. When so moved, it leaves the path of plunger 76 which may then drop under the action of the spring 80 carrying into lowermost position the member 74. In this lowermost position the member engages the base surface of the grid. Upon subsequent release of the member 94, the spring 92 will rock the lever 82 into engagement with the side of the plunger 76. The batter will now be poured upon the lower grid.

The next step consists of movement of the lever 38 into the notch 44 so as to release it from engagement with the arm 36. When such release is effected, the latch 30 may move upwardly into the path of the projection 28.

In order to start the baking operation, the cover 10 is now manually closed by manipulation of the handle 14. As it is so moved, the cable 18 causes movement of slide 22 against the tension of springs 26 and projection 28 rides upon the sloping surface of the latch 30 and then behind the same, the latch first yielding and then snapping into position to hold the slide in its rearward position. Upon release of the handle 14, the cover will remain closed due to its own weight, since the slide cannot move under the action of the springs.

As the slide moves as stated, it no longer engages the cam surface 86 so that the lever 84 is free to move under the action of the spring 88. When it so moves, the lever 82 is dropped past the free end of the plunger 76 and is rocked by the spring 92 across its end into engagement with the stop 90.

The lever 38 is now moved into the position illustrated in dotted lines in Fig. 2. Such movement closes the circuit through the heating elements and at the same time effects movement of the element 54 to first cause its abutment 58 to engage the member 62 and move it to the position illustrated in Fig. 5. Release of the lever 38 then causes engagement of notch 60 by nose 56 whereupon the action of the spring 46 will tend to move the member 62 and the gear 64, now clutched thereto, in a counterclockwise direction. Movement of the gear 68 and the lever 38 and parts associated therewith will then take place slowly under the control of the escapement mechanism. It will be observed that movement of the parts to the position illustrated in Fig. 5 will bring the upwardly projecting pin 59 to the left of the cam 66, which may be placed in any suitable adjusted position by manipulation of lever 68. As rotation of the element 54 proceeds, the pin 59 will ride upon the cam 66 and will be disengaged from the notch 60. As soon as such disengagement takes place, the spring 46 will snap the lever 38 to the end of the slot 42 across the notch 44 into which it will not normally drop unless under manual movement. As it approaches the end of its arc, it engages the lever 36 thereby tripping the latch 30 and permitting the slide 22 to be moved by the springs 26. The cover 10 is thus opened. At the same time, lever 84 is rocked to move lever 82 upwardly and thereby raise the member 74 to carry the cake out of engagement with the grid. Even though the grid is still quite hot, a body of air will lie between the cake and the grid and thereby prevent burning. Since the current is turned off, rapid cooling will, of course, take place, so that the protection is really required only for a fraction of a minute. Of course, the apparatus may operate satisfactorily without interruption of the circuit.

In order to prevent shock upon the opening of the cover 10 under the action of the springs 26, a buffer arrangement is provided consisting of plungers 96 pivoted to the arm 16 and arranged to engage springs 98 within barrels 100 when the cover approaches its open position.

It will be obvious that numerous changes may be made in details of the mechanism without departing from the invention as defined in the following claims.

What I claim and desire to protect by Letters Patent is:

1. A baking device or the like comprising a support, means for heating material on the support, a member underlying a portion of the material and movable upward to lift the material from the support, a slide, a spring tending to move the slide in one direction, a latch arranged to restrain the slide against movement under the action of the spring, means for releasing the latch after a predetermined heating period, and means operated by movement of the slide under action of the spring to raise the member.

2. A baking device or the like comprising a support, means for heating material on the support, a member underlying a portion of the material and movable upward to lift the material from the support, a slide, a spring tending to move the slide in one direction, a latch arranged to restrain the slide against movement under the action of the spring, means for releasing the latch after a predetermined heating period, means operated by movement of the slide under action of the spring to raise the member, and manually operable means for lowering the member subsequently to movement of the slide and prior to its restoration to latched position.

3. A baking device or the like comprising a support capable of receiving and holding batter, electrical means for heating material on the support, an interconnected means operable to lift the baked material from the support and interrupt the current through the heating means after a predetermined heating period.

4. A baking device or the like comprising a support capable of receiving and holding batter, electrical means for heating material on the support, and interconnected means operable to effect opening of the cover, to lift the baked material from the support, and to interrupt the current through the heating means after a predetermined heating period.

5. A baking device or the like comprising a support capable of receiving and holding batter, means for heating material on the support, a cover arranged to close over the material during heating and means for lifting the baked material from the support simultaneously with lifting of the cover, said last named means including a member underlying a portion of the material and normally spring pressed downwardly, a lever arranged to lift the member when the cover is raised, and means for disengaging the lever from the member whereby the member is movable downwardly by the spring.

6. A waffle iron comprising a support capable of receiving and holding batter, means for heating material on the support, said support comprising upwardly projecting members defining grooves between them, and means for lifting the baked material from the support, said last means consisting of a member underlying a portion of the material within a groove in the support.

ASTLEY W. WHARTON.